United States Patent [19]

Stemme et al.

[11] 4,251,143

[45] Feb. 17, 1981

[54] PHOTOGRAPHIC CAMERA WITH MEANS INDICATING THE STATE OF FOCUS

[75] Inventors: Otto Stemme; Istvan Cocron, both of Munich; Peter Lermann, Narring, all of Fed. Rep. of Germany

[73] Assignee: AGFA-Gevaert, A.G., Leverkusen, Fed. Rep. of Germany

[21] Appl. No.: 959,875

[22] Filed: Nov. 13, 1978

[30] Foreign Application Priority Data

Nov. 12, 1977 [DE] Fed. Rep. of Germany ....... 2750735

[51] Int. Cl.³ .................. G03B 3/00; G01J 1/44
[52] U.S. Cl. .................... 354/25; 250/201
[58] Field of Search ............ 354/25, 31, 53, 162, 354/163, 195, 198, 199, 289; 250/201, 204, 578; 352/140; 356/4, 226, 227; 355/56, 58; 328/26; 307/236, 256

[56] References Cited

U.S. PATENT DOCUMENTS

| 3,532,045 | 10/1970 | Genahr | 355/56 |
|---|---|---|---|
| 3,906,389 | 9/1975 | Matsumoto et al. | 354/25 X |
| 3,975,631 | 8/1976 | Takeda | 354/25 X |
| 4,047,022 | 9/1977 | Holle | 354/25 X |
| 4,117,325 | 9/1978 | Holle | 356/227 |
| 4,147,417 | 3/1979 | Mandler | 354/25 |
| 4,155,004 | 5/1979 | Schulz | 354/25 X |

*Primary Examiner*—L. T. Hix
*Assistant Examiner*—William B. Perkey
*Attorney, Agent, or Firm*—Michael J. Striker

[57] ABSTRACT

A camera includes a viewfinder, an objective and a manually operated focus adjuster. An optical system located in the path of incoming image light splits the incoming image light beam into two component beams projected into respective first and second focal planes. First and second planar arrays of photosensitive elements are located in respective first and second photodetector planes. When the objective is correctly focussed and then defocussed in a first direction, the sharpness of the image on the first array increases and that on the other decreases; if the objective is defocussed in the opposite direction, the opposite occurs. A comparator has two outputs, connected to the elements of the first and second arrays via respective first and second circuit branches. Each circuit branch includes at least one subtractor producing an absolute-value output signal independent of the polarity of the difference between the input signals applied thereto. The subtractor inputs are connected to the outputs of respective elements of the respective one of the two arrays. The comparator output signal controls an indication, visible in the camera viewfinder, informing the user of the direction in which he should manually move the focus adjuster to improve the state of focus.

11 Claims, 3 Drawing Figures

PHOTOGRAPHIC CAMERA WITH MEANS INDICATING THE STATE OF FOCUS

BACKGROUND OF THE INVENTION

The present invention concerns photographic cameras provided with a distance-measuring arrangement and a visual indication in the viewfinder of the state of focus of the exposure objective relative to the subject to be shot, such distance-measuring arrangement being of the type comprising means for splitting the incoming image light beam into two component beams, with a photosensitive detector arrangement provided with an electronic evaluating circuit operative for measuring the component beams with respect to symmetry relative to a plane equivalent to the film plane, and provided also with a manual adjuster for adjusting the state of focus of the camera.

Such cameras are found in widespread use for both still and motion-picture photography. The distance or state-of-focus indicating system in the camera viewfinder comprises a calibrated scale, a mixed-image rangefinder or in the case of reflex cameras a matte viewing screen provided with a microprism array, or may be of the split-image type which indicates state of focus by the registration or non-registration of the edges of two halves of the viewfinder image, and so forth. These indicating systems are in general coupled to the focussing system for the exposure objective in such a manner that when the user manually moves the focus adjuster, for example by turning an adjuster ring surrounding the exposure objective, this serves to both change the state of focus of the exposure objective and correspondingly alter the state-of-focus indication in the viewfinder.

With these known indicating systems, it is in general not possible for the user to know whether the focal point of the incoming image light beam is located ahead of or behind the exposure plane, or ahead of or behind a measuring plane optically equivalent to the exposure plane. Accordingly, when the objective is out of focus, the user, often as not, begins to correct this by turning the focussing ring in the wrong direction, followed by the correct direction when he sees no improvement; and then, wishing to improve the state of focus somewhat further, is again ignorant of the direction in which to turn the adjuster ring; and so forth, so that in the course of focussing the camera the user is repeatedly changing the direction in which he is moving the manual focus adjuster.

SUMMARY OF THE INVENTION

It is a general object of the invention to provide a camera of the type in question with a simple means, requiring no moving parts, for indicating the state of focus of the exposure objective and more particularly the sense of any error in the focus, so as to indicate to him the direction in which he should move the manual focus adjuster to correct the situation and bring the image into sharp focus.

In accordance with the present invention, this can be achieved as follows. Each of the two photosensitive detector arrangements, in itself in known manner, comprises a predetermined number of component photosensitive elements, from which light-indicating signals are derived and applied to a subtracting circuit, the light-indicating signals being combined to form two groups, each group being set up to generate information concerning the differences in light incident upon adjoining photosensitive elements.

According to one concept of the invention, all the even-numbered photosensitive elements of one detector arrangement feed light-indicating signals to one input of a subtracting circuit, and all the odd-numbered photosensitive elements to the other input thereof.

According to another concept of the invention, within each of the two detector arrangements, the successive photosensitive elements are organized as element pairs. The light-indicating signals from one pair of adjoining photosensitive elements are applied to respective ones of the two inputs of a respective subtracting circuit provided for that element pair only.

The subtracting circuit, or each of the plural subtracting circuits, comprises two difference amplifiers, each having an inverting and a non-inverting input. The outputs of the two difference amplifiers are connected together via respective diodes, the junction between the two diodes constituting the output of the subtracting circuit.

One input of a comparator then receives the output signal from the subtracting circuit of one photodetector arrangement, and the other comparator input receives the output signal from the subtracting circuit of the other photodetector arrangement.

Or in the case where the elements within each detector arrangement are grouped pairwise and provided, pair by pair, with respective subtracting circuits, one comparator input receives the signals from the outputs of all subtracting circuits associated with one of the two photodetector arrangements, whereas the other comparator input receives the signals from the outputs of all subtracting circuits associated with the other of the two photodetector arrangements.

The output signal of the comparator is used to control two indications visible in the camera viewfinder for indicating to the user which direction he should move the manual focus adjuster if he is to improve the state of focus.

By subtracting the sum of the signals produced by the odd-numbered photosensitive elements from the sum of the signals produced by the even-numbered elements in the respective photodetector arrangements, the resulting difference signal is a signal which is at a maximum when the image projected onto the respective photodetector arrangement is at maximum sharpness. With increasing lack of image sharpness, the value of the difference signal decreases, and to an increasingly greater extent.

The formation of the difference signal can be performed equally well by directly subtracting the light-dependent signal produced by one photosensitive element from that produced by its neighbor, i.e., performing the subtraction on the basis of pairs of adjoining photosensitive elements. Advantageously then, the plural difference signals that then result, i.e., one from each pair of neighboring elements, are then added for all the element-pairs in one of the two photodetector arrangements, to produce a sum signal. Then this sum signal, for one of the two photodetector arrangements, is applied to one input of the aforementioned comparator, while the sum signal associated with the other of the two photodetector arrangements is applied to the other comparator input, the comparator output here again determining the display states of the indicators for the sense of the state-of-focus error.

According to a particularly advantageous concept of the invention, when any of the aforementioned difference signals is produced, its polarity is independent of the polarity of the difference or subtraction in question, e.g., is always positive irrespective of whether the difference it represents has a positive or negative polarity. Preferably this is accomplished by using two difference amplifiers to form each difference signal, with the inverting input of one difference amplifier connected in common to the non-inverting input of the second difference amplifier, and with the non-inverting input of the first connected in common to the inverting input of the second, although of course equivalent subtraction circuits could be employed. The outputs of the two difference amplifiers are then connected to a common output terminal, at which the difference signal in question appears, via respective ones of two diodes.

In order to make the inventive device very compact, it is preferred to arrange the photosensitive elements of the two photodetector arrangements on a single carrier or substrate, i.e., even though the optical principle underlying operativeness of the arrangement involves the projection of incoming image light onto two differing planes so that the sharpness of image on the two differing planes will differ. To retain this basic optical action, the invention contemplates providing a further, intermediate optical element in the light path of one of the two photodetector arrangements, and serving to displace the focal plane of the latter by a distance equal to twice the distance of the photodetector arrangements from the film plane, or the optically equivalent measuring plane, of the focussing system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
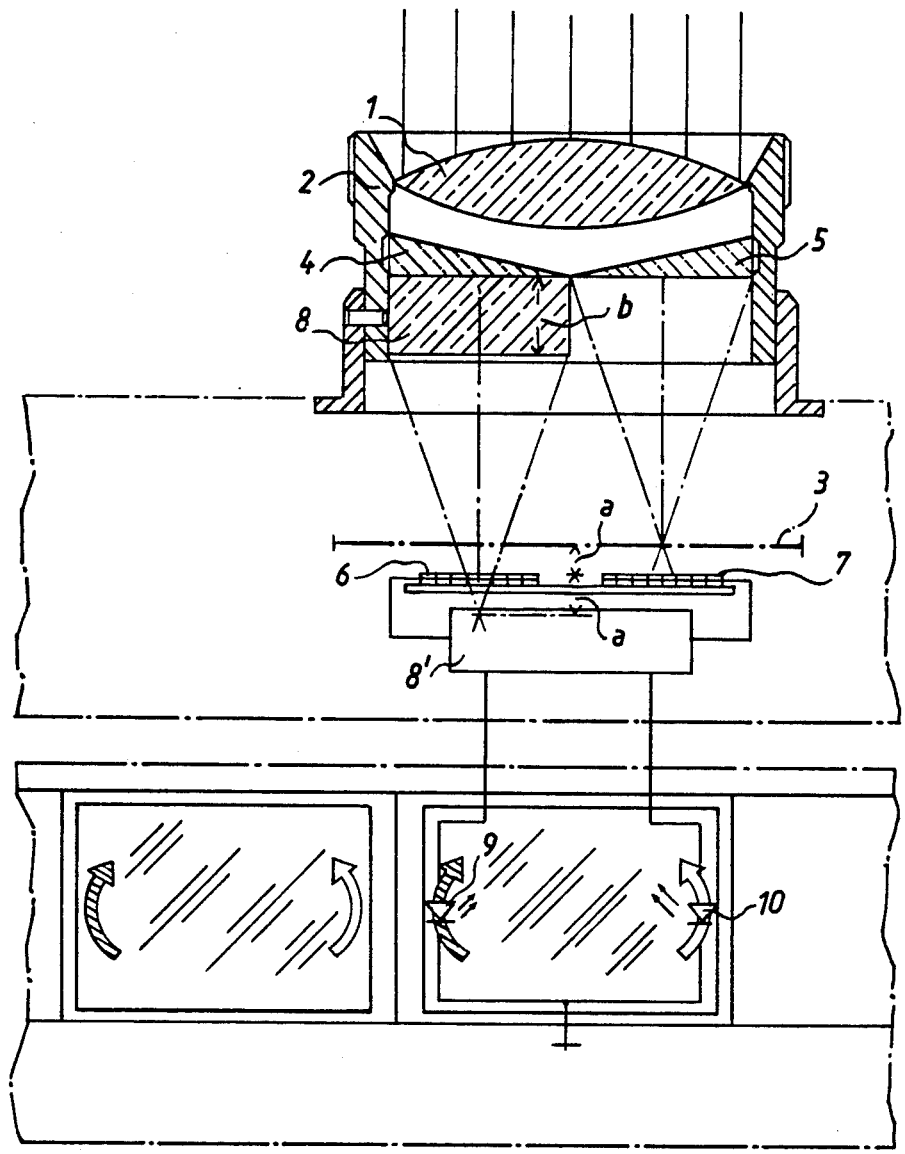
FIG. 1 depicts the construction of a first exemplary embodiment of the invention.

In FIG. 1, the illustrated focussing system includes an objective 1 secured in a ring-like camera mount 2 coupled, by means of a conventional screwthread system, to the housing or optics tube of the camera, for shifting the objective towards and away from the measuring plane 3 of the focussing system.

Objective 1 may be a viewfinder system objective distinct from the camera's actual exposure objective. In such cameras, when the user turns the focussing ring 2 and thereby shifts the viewfinder objective 1 to focus the viewfinder image, this simultaneously, and correspondingly, changes the state of focus of the camera's exposure objective, so that the viewfinder image simulates the image which would be cast onto the camera's film.

Alternatively, as in the case of reflex cameras, the objective 1 may actually be the camera's exposure objective, with a (non-illustrated) semitransparent mirror or the like serving to deflect a fraction of the incoming image light into the camera's viewfinder system.

In any case, the objective 1 is followed by two prisms 4 and 5 operative for producing two sharp images in the measuring plane 3, when the camera's state of focus is correct, i.e., if the optical element 8 described below were not present. It will be understood that measuring plane 3, although it may be located in space differently from the camera's actual film plane, is optically equivalent to the camera's film plane. The prisms 4, 5 serve to divide the incoming image light beam into two component beams, which are projected onto respective ones of two photodetector arrangements 6, 7. The two photodetector arrangements 6, 7 generate two signals indicating the image contrast and in this way the state of focus of these two images, or else they generate signals which are converted into two such signals.

Numeral 8 denotes a transparent plane-parallel plate serving to shift the focal plane of the light beam passing through prism 4 past the measuring plane 3 by a distance equal to twice the distance from the photodetector arrangement 6 to the measuring plane 3. To this end, plane-parallel plate 8 has a thickness b operative for shifting the focal plane of the associated light beam by a distance 2a relative to the focal plane of the other of the two light beams. This advantageously makes it possible to locate the two photodetector arrangements 6, 7 in a common plane, i.e., so that they can be compactly arranged on a single flat carrier element or substrate.

Numeral 8' denotes an electronic signal-evaluating circuit, in whose output circuit are connected two light-emitting diodes 9 and 10. The light-emitting surfaces of these LED's 9, 10 have the shape of curved arrows, one pointing clockwise and the other counterclockwise. The LED's 9, 10 are so located, and so connected to the outputs of evaluating circuit 8', that the clockwise pointing LED 9 lights up when the user should turn the focussing ring 2 clockwise, and the counterclockwise pointing LED 10 when the user should turn ring 2 counterclockwise Of course, if the manual focus adjuster is not a turnable ring, the curved arrow LED's 9, 10 could be redesigned in a manner appropriate for the manual movements to be performed. In the setting of the system actually illustrated in FIG. 1, the image light beam from prism 4 is focussed onto a focal plane located a distance 2a behind the measuring plane 3, and the image light beam from prism 5 is focussed onto the measuring plane 3 which is located a distance a in front of the second photodetector arrangement 7.

Figure 2:
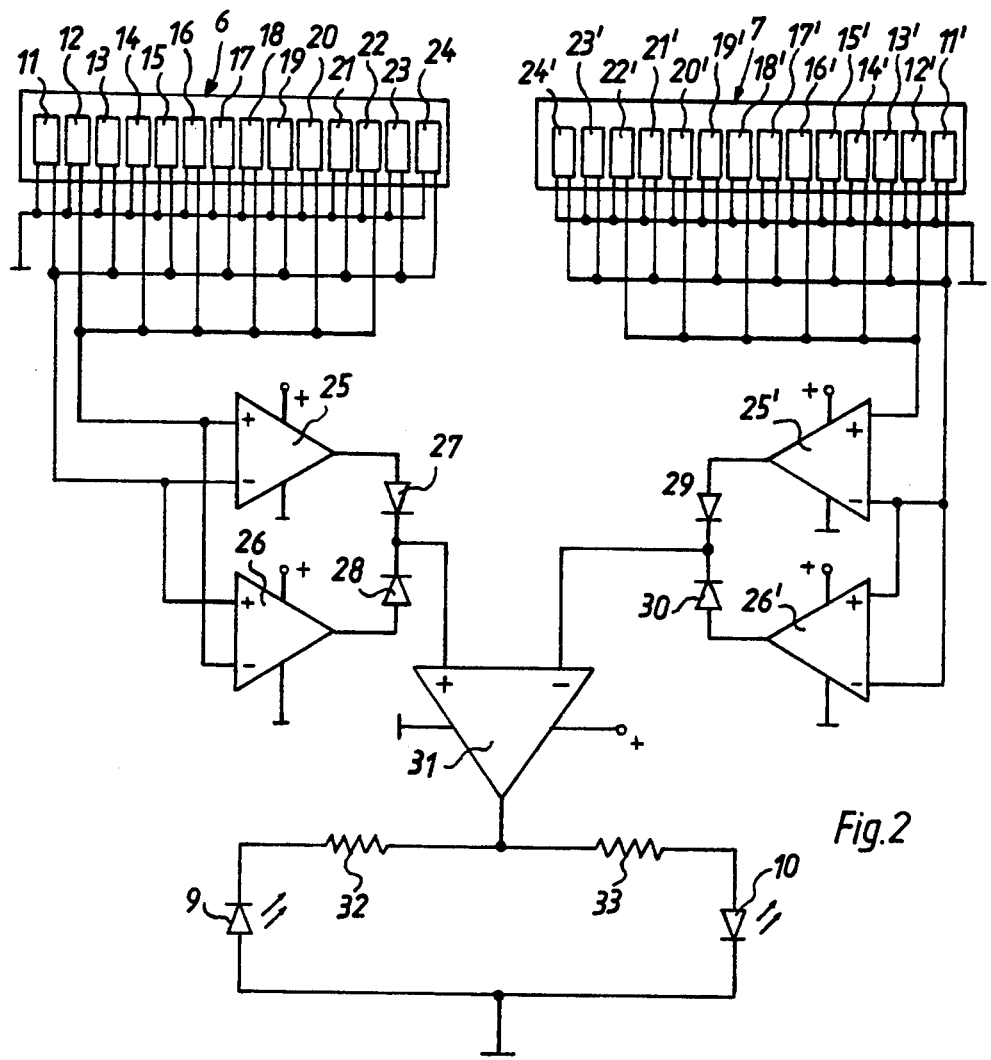
FIG. 2 depicts the circuitry employed in such first embodiment.

FIG. 2 depicts circuitry which can be used with the construction shown in FIG. 1. The left photodetector arrangement 6 comprises fourteen photosensitive elements 11, 12, 13, 14, 15, 16, 17, 18, 19, 20, 21, 22, 23, 24. The right photodetector arrangement 7 likewise comprises fourteen photosensitive elements 11', 12', 13', 14', 15', 16', 17', 18', 19', 20', 21', 22', 23', 24'. The photosensitive elements are preferably silicon photodiodes.

In photodetector arrangement 6, the outputs of all the odd-numbered elements 11, 13, 15, 17, 19, 21, 23, and also the output of the last element 24, are connected in common to the inverting input of a difference amplifier 25 and to the non-inverting input of a difference amplifier 26. The outputs of all the even-numbered elements 12, 14, 16, 18, 20, 22, except for the last element 24, are connected in common to the non-inverting input of difference amplifier 25, and to the inverting input of difference amplifier 26.

The outputs of the photosensitive elements 11' to 24' of second photodetector arrangement 7 are connected, in identical fashion, to the inverting and non-inverting inputs of two difference amplifiers 25' and 26'. The difference amplifiers 25, 26, 25', 26' are preferably standard operational-amplifier units.

The outputs of difference amplifiers 25 and 26 are joined via respective diodes 27, 28, and in the same way the outputs of difference amplifiers 25' nd 26' are joined via diodes 29 and 30. The junction between diodes 27, 28 is connected to the non-inverting input of an operational-amplifier comparator 31 whereas the junction between diodes 29, 30 is connected to the inverting input thereof, difference amplifier 31 here serving as a comparator. The output voltage of comparator 31 assumes a positive or a negative value, depending upon the sign of the difference of the signals applied to its two inputs.

The use of a pair of difference amplifiers 25, 26 and a diode pair 27, 28 assures that the output signal produced at the junction between diodes 27 and 28 is always of positive polarity. The signals at the outputs of the two difference amplifiers 25, 26 are always of the same magnitude, but always of opposite polarity, because each difference amplifier input is connected to the 180°-phase-shifted counterpart of the other difference amplifier. Thus, at all times, one or the other of the two equal-value signals at the outputs of difference amplifiers 25, 26 will be of positive polarity, and will be transmitted via the respective ones of the two diodes 27, 28 to the junction between the two diodes.

The output voltage of comparator 31 is applied across a first current-limiting resistor 32 and the LED 9, the latter connected to be illuminated by a negative voltage, and also across a second current-limiting resistor 33 and the LED 10, the latter connected to be illuminated by a positive voltage from the output of comparator 31.

The embodiment of FIGS. 1 and 2 operates as follows:

When the camera is correctly focussed, the light beam coming through prism 5 is focussed onto the measuring plane 3, a distance a ahead of second photodetector arrangement 7. The light beam coming through prism 4 and plane-parallel plate 8 is focussed onto a plane located a distance a behind the first photodetector arrangement 6. I.e., the common plane of the two photodetector arrangements 6, 7 is located exactly midway between the two focal planes. Accordingly, the two input signals to operational-amplifier comparator 31 are of equal value, the output voltage of the comparator is zero, and neither of the two LED's 9, 10 lights up.

If the camera is then defocussed in a first sense, e.g., by wrongly turning focus ring 2 in one direction, the focal plane of the left image beam in FIG. 1 comes closer to the photodetector plane, thereby improving the sharpness of the image cast on photodetector arrangement 6, while the focal plane of the right image beam moves further from the photodetector plane, thereby decreasing the sharpness of the image cast on photodetector arrangement 7, resulting in a corresponding change in the two input signals to comparator 31. As a result, the first of the two LED's 9, 10 lights up, i.e., the one indicating the direction in which the user should turn the focussing ring 2 back into a correct focus condition.

If the camera is then defocussed in the opposite second sense, e.g., by wrongly turning focus ring 2 in the opposite direction, the focal plane of the left image beam in FIG. 1 moves further from the photodetector plane than shown in FIG. 1, thereby further worsening the sharpness of the image cast on photodetector arrangement. In contrast, the focal plane of the right image beam moves closer to the photodetector plane than down in FIG. 1, thereby increasing the sharpness of the image cast on photodetector arrangement 7. This results in a corresponding change in the two input signals to comparator 31, but now in the opposite second sense. As a result, the other of the two LED's 9, 10 lights up, i.e., the one now indicating the opposite direction as the direction in which the adjuster ring 2 should be turned to restore focus.

In the circuit of FIG. 2, the output signal of photodetector arrangement 6, appearing at the junction of diodes 27, 28, is dependent upon the contrast and in that sense the focus of the image cast on photodetector arrangement 6, inasmuch as it mainly represents the difference between two sum signals, one sum signal being the sum of the output signals from the even-numbered elements except for element 24, the other sum signal being the sum of the output signals from the odd-numbered elements plus also that from element 24. Similar remarks apply to the difference signal from second photodetector arrangement 7, appearing at the junction of diodes 29, 30.

Figure 3:
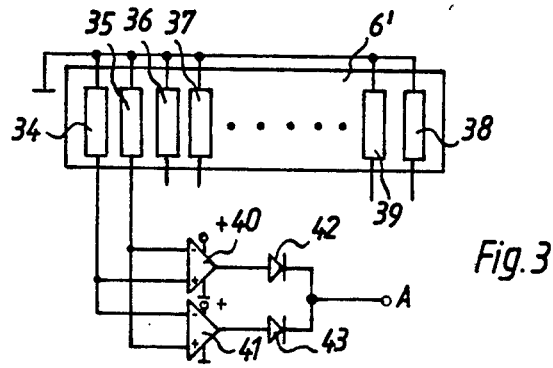
FIG. 3 depicts the circuitry employed in a second exemplary embodiment of the invention.

FIG. 3 depicts a modification of the FIG. 2 circuit, producing, for each of the two photodetector arrangements, a difference signal more directly dependent upon image sharpness but requiring for its implementation the use of a greater number of difference amplifiers.

In FIG. 3, the left photodetector arrangement 6' comprises several pairs of photosensitive elements 34, 35; 36, 37; . . . ; 38, 39. A subtracting stage 40–43 comprising two difference amplifiers and two diodes corresponds exactly to the subtracting stage 25–28 described with respect to FIG. 1. However, for the photodetector arrangement 6' of FIG. 2, there is employed a plurality of such stages, equal in number to the total number of photosensitive elements in the photodetector arrangement 6', divided by two. For the photodetector arrangement 6', only one such subtracting stage 40–43 is shown, for the first two photosensitive elements 34, 35, and the difference signal produced by this stage appears at terminal A. All the A output terminals of the plural subtracting stages of photodetector arrangement 6' of FIG. 3 are connected, in common, to the non-inverting input of an operational-amplifier comparator, i.e., just like the comparator 31 in FIG. 2. Similar remarks apply to the (non-illustrated) second photodetector arrangement for the modification shown in FIG. 3.

With this configuration, the state-of-focus information contained in the two signals applied to the operational-amplifier comparator (like 31 in FIG. 2) is more directly indicative of image sharpness, because the absolute value of the difference between the output signals of each two neighboring photosensitive elements is ascertained and separately amplified before any summation. In FIG. 2, because summation is performed before subtraction and formation of absolute-value signals, there is a greater possibility of difference information from two neighboring photosensitive elements partly cancelling out difference information from another two neighboring elements, in the process of the initial summation up-circuit of the difference-amplifier inputs.

Advantageously, the comparator 31 employed exhibits a certain amount of hysteresis, preferably adjustable, such that when the value of the difference between the comparator input signals enters into a small range of small difference values centered about null, the comparator output potential goes to zero, or to a value such that neither LED 9, 10 lights up, even if the difference value subsequently changes in polarity, until such time as the difference value again falls outside such small range. This prevents the development of an oscillating display in the viewfinder when the camera is right at focussed condition, i.e., so as not to put the user in a position where, after bringing the camera into good focus, he is repeatedly instructed to turn the adjuster ring just a little bit further in one direction and then the other. Such a dead zone can be established, for example, by connecting an adjustable resistor between the output and inverting input of the operational-amplifier comparator 31; in that case, it is then advantageous to connect another such resistor between the inverting input of the comparator and the negative supply terminal.

The circuit configurations shown in FIGS. 2 and 3 represent, in a sense, two extremes, that of FIG. 2 requiring the least circuitry but at the cost of less direct dependence of the subtracting stage output signal on image contrast; that of FIG. 3 affording very much more direct dependence upon image contrast but requiring a greater amount of circuitry. Persons skilled in the art are expected to understand that these two extremes, both preferred, are nevertheless only illustrative in terms of the scope of possibilities contemplated. Thus, although not particularly preferred, it would be possible to subdivide the photosensitive elements of each detector arrangement, not into even- and odd-numbered ones as in FIG. 2, nor into pairs of adjoining elements as in FIG. 3, but, for example, into groups of four adjoining elements each.

In that event, the outputs of the first and third elements in such group of four would be connected in common to the non-inverting input of the first difference amplifier in a respective subtracting stage and also to the inverting input of the second difference amplifier of such stage; with the second and fourth elements in such group connected in common to the inverting input of the first difference amplifier and to the non-inverting input of the second difference amplifier. Then, the number of such subtracting stages required would be equal to the number of photosensitive elements in the detector arrangement, divided by four. This would, so to speak, be between the two extremes constituted by the configurations of FIGS. 2 and 3.

Also, whereas in FIGS. 2 and 3 two photodetector arrangements are each constituted by a simple row of photosensitive elements such as photodiodes, other arrays of photosensitive elements, such as two-dimensional arrays, could be employed, with the connection to subtracting stages following the principles explained above with respect to FIGS. 2 and 3. Likewise, although the use of rows of photosensitive elements interconnected as in FIGS. 2 and 3 is presently preferred, use could in principle be made of other optoelectronic element types or structures.

It will also be understood that considerable variations is contemplated with respect to the construction shown in FIG. 1. Certainly, although the use of plane-parallel plate 8 is preferred to make possible provision of a common planar carrier or substrate for the elements of the two detector arrangements 6, 7, plate 8 could be omitted if the two detector arrangements 6, 7 were not mounted in a common plane.

It will be understood that each of the elements described above, or two or more together, may also find a useful application in other types of circuits and constructions differing from the types described above.

While the invention has been illustrated and described as embodied in a state-of-focus evaluating system with an indicating system for displaying the sense of the state-of-focus error, both of particular types, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpont of prior art, fairly constitute essential characteristics of the generic or specific aspects of this invention.

What is claimed as new and desired to be protected by Letters Patent is set forth in the appended claims.

1. In a photographic camera having a viewfinder, an objective and a manually operated focus adjuster used by the photographer for adjusting the state of focus of the camera, a semiautomatic focussing system comprising, in combination, optical means located in the path of the incoming image light beam entering through the objective and operative for dividing the incoming image light beam into first and second component beams and projecting the first and second component beams onto respective first and second focal planes;

first and second planar photodetector arrangements located in respective first and second photodetector planes, the focal planes and the photodetector planes being so located relative to one another that the following conditions are met:

a. when the objective is correctly focussed and then defocussed in a first direction the sharpness of the image cast on the first photodetector arrangement increases while the sharpness of the image cast on the second photodetector arrangement decreases, b. when the objective is correctly focussed and then defocussed in the opposite second direction the sharpness of the image cast on the first photodetector arrangement decreases while the sharpness of the image cast on the second photodetector arrangement increases, each of the two photodetector arrangements comprising a respective array of photosensitive elements;

evaluating circuit means operative for generating signals indicating whether the objective is defocussed in the first direction or in the second direction, the evaluating circuit means comprising a comparator having an output and first and second inputs, a first circuit branch connecting the outputs of the photosensitive elements of the first detector arrangement to the first comparator input, and a second circuit branch connecting the outputs of the photosensitive elements of the second detector arrangement to the second comparator input, each circuit branch comprising:

at least one subtractor means having an output and first and second inputs and operative for producing at its output a difference signal dependent upon the difference in value of the signals applied to its inputs but independent of the polarity of such difference, and input signal-transmitting means connecting the first and second inputs of the at least one subtractor means to respective ones of the photosensitive elements of the respective photodetector arrangement for transmitting the output signals from the latter to the former, the first and second circuit branches furthermore including respective first and second output signal-transmitting means connecting the outputs of the respective subtractor means to respective ones of the two comparator inputs, each subtractor means comprising first and second difference amplifiers each having an inverting and a non-inverting input and also an output, the inverting input of the first difference amplifier being joined together with the non-inverting input of the second difference amplifier and constituting the first input of the subtractor means, the non-inverting input of the first difference amplifier being joined together with the inverting input of the second difference amplifier and constituting the second input of the subtractor means, and first and second diodes each having a first terminal connected to the output of a respective one of the two difference amplifiers and having second terminals connected in common to form the output of the subtractor means; and indicating means connected to the output of comparator and operative in dependence upon the comparator output signal for providing a visible indication in the camera viewfinder of the direction in which the manual focus adjuster should be moved by the user to improve the state of focus.

2. The focussing system defined in claim 1, each of the first and second circuit branches containing only one such subtractor means, the photosensitive elements of each array comprising first elements alternating with second elements, the outputs of the first elements being connected to the first input of the respective subtractor means, and the outputs of the second elements being connected to the second elements of the respective subtractor means.

3. The focussing system defined in claim 2, each photodetector arrangement consisting of a one-dimensional array of photosensitive elements, the first photosensitive elements being the even-numbered ones and the second photosensitive elements the odd-numbered ones or vice versa.

4. The focussing system defined in claim 1, each photodetector arrangement consisting of a one-dimensional array of photosensitive elements.

5. The focussing system defined in claim 1, the photosensitive elements of each array comprising pairs of adjoining photosensitive elements, each of the first and second circuit branches containing a plurality of such subtractor means, each being as defined above, the number of subtractor means in each circuit branch corresponding to the number of adjoining-element pairs in the respective array, the first input of each subtractor means being connected to the output of one of the two elements in one respective element pair, the other input of each subtractor means being connected to the output of the other of the two elements in the respective element pair, the first output signal-transmitting means connecting the outputs of all the subtractor means associated with the first photodetector arrangements to the first input of the comparator, the second output signal-transmitting means connecting the outputs of all the subtractor means associated with the second photodetector arrangements to the second input of the comparator.

6. The focussing system defined in claim 5, each photodetector arrangement consisting of a one-dimensional array of photosensitive elements.

7. The focussing system defined in claim 1, the indicating means including two indicator elements connected to and controlled by the output of the comparator, each operative when activated by the comparator for indicating to the user that the manual focus adjuster should be manually moved in a respective one of two directions.

8. The focussing system defined in claim 1, the first and second photodetector planes being the same plane, the first and second focal planes not being indentical to each other, the focal planes and the photodetector plane being so located that when the objective is correctly focussed the distance from the first focal plane to the photodetector plane equals the distance from the photodetector plane to the second focal plane.

9. In a photographic camera having a viewfinder, an objective and a manually operated focus adjuster used by the photography for adjusting the state of focus of the camera, a semiautomatic focussing system comprising, in combination, optical means located in the path of the incoming image light beam entering through the objective and operative for dividing the incoming image light beam into first and second component beams and projecting the first and second component beams onto respective first and second focal planes;

first and second planar photodetector arrangements located in respective first and second photodetector planes, the focal planes and the photodetector planes being so located relative to one another that the following conditions are met:

a. when the objective is correctly focussed and then defocussed in a first direction the sharpness of the image cast on the first photodetector arrangement increases while the sharpness of the image cast on the second photodetector arrangement decreases, b. when the objective is correctly focussed and then defocussed in the opposite second direction the sharpness of the image cast on the first photodetector arrangement decreases while the sharpness of the image cast on the second photodetector arrangement increases, each of the two photodetector arrangements comprising a respective array of photosensitive elements;

evaluating circuit means operative for generating signals indicating whether the objective is defocussed in the first direction or in the second direction, the evaluating circuit means comprising a comparator having an output and first and second inputs, a first circuit branch connecting the outputs of the photosensitive elements of the first detector arrangement to the first comparator input, and a second circuit branch connecting the outputs of the photosensitive elements of the second detector arrangement to the second comparator input, each circuit branch comprising:

at least one subtractor means having an output and first and second inputs and operative for producing at its output a difference signal dependent upon the difference in value of the signals applied to its inputs but independent of the polarity of such difference, and input signal-transmitting means connecting the first and second inputs of the at least one subtractor means to respective ones of the photosensitive elements of the respective photodetector arrangement for transmitting the output signals from the latter to the former, the first and second circuit branches furthermore including respective first and second output signal-transmitting means connecting the outputs of the respective subtractor means to respective ones of the two comparator inputs, each of the first and second circuit branches containing only one such subtractor means, the photosensitive elements of each array comprising first elements alternating with second elements, the outputs of the first elements being connected to the first input of the respective substractor means, and the outputs of the second elements being connected to the second input of the respective subtractor means; and indicating means connected to the output of the comparator and operative in dependence upon the comparator output signal for providing a visible indication in the camera viewfinder of the direction in which the manual focus adjuster should be moved by the user to improve the state of focus.

10. The focussing system defined in claim 9, each photodetector arrangement consisting of a one-dimensional array of photosensitive elements, the first photosensitive elements being the even-numbered ones and the second photosensitive elements the odd-numbered ones.

11. In a photographic camera having a viewfinder, an objective and a manually operated focus adjuster used by the photographer for adjusting the state of focus of the camera, a semiautomatic focussing system comprising, in combination, optical means located in the path of the incoming image light beam entering through the objective and operative for dividing the incoming image light beam into first and second component beams and projecting the first and second component beams onto respective first and second focal planes;

first and second planar photodetector arrangements located in respective first and second photodetector planes, the focal planes and the photodetector planes being so located relative to one another that the following conditions are met:

a. when the objective is correctly focussed and then defocussed in a first direction the sharpness of the image cast on the first photodetector arrangement increases while the sharpness of the image cast on the second photodetector arrangement decreases, b. when the objective is correctly focussed and then defocussed in the opposite second direction and sharpness of the image cast on the first photodetector arrangement decreases while the sharpness of the image cast on the second photodetector arrangement increases, each of the two photodetector arrangements comprising a respective array of photosensitive elements;

evaluating circuit means operative for generating signals indicating whether the objective is defocussed in the first direction or in the second direction, the evaluating circuit means comprising a comparator having an output and first and second inputs, a first circuit branch connecting the outputs of the photosensitive elements of the first detector arrangement to the first comparator input, and a second circuit branch connecting the outputs of the photosensitive elements of the second detector arrangement to the second comparator input, each circuit branch comprising:

at least one subtractor means having an output and first and second inputs and operative for producing at its output a difference signal dependent upon the difference in value of the signals applied to its inputs but independent of the polarity of such difference, and input signal-transmitting means connecting the first and second inputs of the at least one subtractor means to respective ones of the photosensitive element of the respective photodetector arrangement for transmitting the output signals from the latter to the former, the first and second circuit branches furthermore including respective first and second output signal-transmitting means connecting the outputs of the respective subtractor means to respective ones of the two comparator inputs, the photosensitive elements of each array comprising pairs of adjoining photosensitive elements, each of the first and second circuit branches containing a plurality of such subtractor means, each being as defined above, the number of subtractor means in each circuit branch corresponding to the number of adjoining-element pairs in the respective array, the first input of each subtractor means being connected to the output of one of the two elements in one respective element pair, the other input of each subtractor means being connected to the output of the other of the two elements in the respective element pair, the first output signal-transmitting means connecting the outputs of all the subtractor means associated with the first photodetector arrangements to the first input of the comparator, the second output signal-transmitting means connecting the outputs of all the subtractor means associated with the second photodetector arrangement to the second input of the comparator; and indicating means connected to the output of the comparator and operative in dependence upon the comparator output signal for providing a visible indication in the camera viewfinder of the direction in which the manual focus adjuster should be moved by the user to improve the state of focus.

* * * * *